US008764057B1

(12) United States Patent
Jamison et al.

(10) Patent No.: US 8,764,057 B1
(45) Date of Patent: Jul. 1, 2014

(54) MULTI-CHAMBER DRIVER AIRBAGS

(71) Applicant: Autoliv ASP, Inc., Ogden, UT (US)

(72) Inventors: Patrick Dee Jamison, North Ogden, UT (US); Christina Morris, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/744,225

(22) Filed: Jan. 17, 2013

(51) Int. Cl.
*B60R 21/231* (2011.01)

(52) U.S. Cl.
USPC .................. 280/743.1; 280/729; 280/731

(58) Field of Classification Search
USPC .................................... 280/743.1, 729, 731
See application file for complete search history.

(56) References Cited

U.S. PATENT DOCUMENTS

| | | | |
|---|---|---|---|
| 5,172,933 A | 12/1992 | Strasser | |
| 5,249,824 A * | 10/1993 | Swann et al. | 280/729 |
| 5,492,362 A | 2/1996 | Lehman et al. | |
| 5,513,879 A | 5/1996 | Patel et al. | |
| 5,529,337 A | 6/1996 | Takeda et al. | |
| 5,573,270 A | 11/1996 | Sogi et al. | |
| 5,669,632 A | 9/1997 | Johnson et al. | |
| 5,697,641 A * | 12/1997 | McGee et al. | 280/743.1 |
| 5,833,265 A | 11/1998 | Seymour | |
| 5,884,574 A | 3/1999 | Sogi et al. | |
| 5,901,979 A * | 5/1999 | Schneider et al. | 280/738 |
| 5,918,902 A | 7/1999 | Acker et al. | |
| 5,957,485 A | 9/1999 | Hirai | |
| 6,022,046 A | 2/2000 | Isomura et al. | |
| 6,059,312 A * | 5/2000 | Staub et al. | 280/729 |
| 6,089,599 A | 7/2000 | Schimmoller et al. | |
| 6,089,600 A | 7/2000 | Schenck et al. | |
| 6,095,557 A * | 8/2000 | Takimoto et al. | 280/739 |
| 6,260,877 B1 * | 7/2001 | Rasmussen, Sr. | 280/729 |
| 6,276,716 B1 * | 8/2001 | Kato | 280/735 |
| 6,283,499 B1 | 9/2001 | Nelsen et al. | |
| 6,302,433 B1 | 10/2001 | Ellerbrok et al. | |
| 6,361,067 B1 * | 3/2002 | Varcus et al. | 280/729 |
| 6,439,605 B2 * | 8/2002 | Ariyoshi | 280/739 |
| 6,471,239 B1 * | 10/2002 | Nishijima et al. | 280/729 |
| 6,471,244 B1 * | 10/2002 | Nishijima et al. | 280/742 |
| 6,478,331 B1 | 11/2002 | Lang | |
| 6,568,708 B2 * | 5/2003 | Miodek et al. | 280/740 |

(Continued)

FOREIGN PATENT DOCUMENTS

| | | |
|---|---|---|
| EP | 657329 | 6/1995 |
| EP | 1024060 | 8/2000 |

(Continued)

OTHER PUBLICATIONS

Notification of Transmittal of the International Search Report and the Written Opinion of the International Searching Authority issued Feb. 15, 2011 in International Application No. PCT/US2010/061055.

(Continued)

*Primary Examiner* — Nicole Verley
(74) *Attorney, Agent, or Firm* — Stoel Rives LLP

(57) ABSTRACT

A driver airbag can be deployed from a steering wheel of a vehicle. The airbag can include a first inflatable chamber and a second inflatable chamber that can be deployed adjacent to the first inflatable chamber. The airbag can further include a one-way valve that controls inflation gas movement relative to at least the first inflatable chamber.

30 Claims, 9 Drawing Sheets

(56) References Cited

U.S. PATENT DOCUMENTS

| | | | |
|---|---|---|---|
| 6,598,903 B2 | 7/2003 | Okada et al. | |
| 6,612,609 B1 | 9/2003 | Rodriguez et al. | |
| 6,648,366 B2 | 11/2003 | Dillon et al. | |
| 6,676,158 B2 * | 1/2004 | Ishikawa | 280/743.1 |
| 6,848,714 B2 * | 2/2005 | Varcus | 280/743.1 |
| 7,066,487 B2 * | 6/2006 | Sullivan et al. | 280/729 |
| 7,210,701 B2 | 5/2007 | Meissner et al. | |
| 7,210,702 B2 * | 5/2007 | Soderquist | 280/740 |
| 7,264,268 B2 * | 9/2007 | Ehrke | 280/729 |
| 7,316,415 B2 | 1/2008 | Jamison | |
| 7,398,992 B2 * | 7/2008 | Marriott | 280/729 |
| 7,543,849 B2 * | 6/2009 | Bradburn | 280/739 |
| 7,648,166 B2 * | 1/2010 | Maripudi | 280/740 |
| 7,708,305 B2 | 5/2010 | Ishiguro et al. | |
| 7,922,191 B2 * | 4/2011 | Choi | 280/729 |
| 8,061,734 B2 * | 11/2011 | Parks et al. | 280/739 |
| 8,215,665 B2 * | 7/2012 | Ohara et al. | 280/729 |
| 8,282,122 B2 * | 10/2012 | Marable et al. | 280/729 |
| 8,419,050 B2 * | 4/2013 | Yoo | 280/729 |
| 8,419,056 B2 * | 4/2013 | Parks et al. | 280/739 |
| 8,480,122 B2 * | 7/2013 | Ohara | 280/729 |
| 2003/0151233 A1 | 8/2003 | Varcus | |
| 2003/0201628 A1 | 10/2003 | Roychoudhury et al. | |
| 2005/0073139 A1 | 4/2005 | Fischer et al. | |
| 2005/0285379 A1 | 12/2005 | Soderquist | |
| 2006/0197320 A1 | 9/2006 | Abe | |
| 2007/0278774 A1 | 12/2007 | Ishiguro et al. | |
| 2008/0224457 A1 | 9/2008 | Brough et al. | |
| 2011/0079991 A1 | 4/2011 | Ravenberg et al. | |
| 2011/0148083 A1 | 6/2011 | Paxton et al. | |

FOREIGN PATENT DOCUMENTS

| | | | | |
|---|---|---|---|---|
| EP | 1183170 | | 3/2002 | |
| EP | 1369317 | | 1/2006 | |
| EP | 1778525 | | 5/2007 | |
| GB | 2252083 | | 1/1991 | |
| GB | 2261855 | | 6/1993 | |
| GB | 2277719 | | 11/1994 | |
| GB | 2331049 | | 5/1999 | |
| JP | 1132444 | | 5/1989 | |
| JP | 04244453 A | * | 9/1992 | B60R 21/28 |
| JP | 7156730 | | 6/1995 | |
| JP | 8011659 | | 1/1996 | |
| JP | 2001277988 | | 10/2001 | |
| JP | 2001322521 | | 11/2001 | |
| JP | 2003525810 | | 9/2003 | |
| JP | 4513724 | | 7/2010 | |
| JP | 5069848 | | 8/2012 | |
| WO | WO-98/42543 | | 3/1998 | |
| WO | WO-99/42332 | | 8/1999 | |
| WO | WO-00/15474 | | 3/2000 | |
| WO | WO-2011/079044 | | 6/2011 | |

OTHER PUBLICATIONS

Restriction Requirement mailed Jun. 22, 2006 in U.S. Appl. No. 10/874,452, now issued as U.S. Patent No. 7,210,702.
Response to Restriction Requirement filed Jul. 18, 20016 in U.S. Appl. No. 10/874,452, now issued as U.S. Patent No. 7,210,702.
Office Action mailed Jul. 28, 2006 in U.S. Appl. No. 10/874,452, now issued as U.S. Patent No. 7,210,702.
Interview Summary mailed Nov. 7, 2006 in U.S. Appl. No. 10/874,452, now issued as U.S. Patent No. 7,210,702.
Amendment and Response to Office Action filed Nov. 28, 2006 in U.S. Appl. No. 10/874,452, now issued as U.S. Patent No. 7,210,702.
Notice of Allowance and Fee(s) Due mailed Jan. 26, 2007 in U.S. Appl. No. 10/874,452, now issued as U.S. Patent No. 7,210,702.
Restriction Requirement mailed Nov. 16, 2011 in co-pending U.S. Appl. No. 12/643,760, now published as U.S. Patent Application Publication No. US 2011/0148083.
Amendment and Response to Requirement of Election of Species filed Dec. 16, 2011 in co-pending U.S. Appl. No. 12/643,760, now published as U.S. Patent Application Publication No. US 2011/0148083.
Office Action mailed Mar. 28, 2012 in co-pending U.S. Appl. No. 12/643,760, now published as U.S. Patent Application Publication No. US 2011/0148083.
Amendment and Response to Office Action filed Sep. 28, 2012 in co-pending U.S. Appl. No. 12/643,760, now published as U.S. Patent Application Publication No. US 2011/0148083.
Final Office Action mailed Nov. 9, 2012 in co-pending U.S. Appl. No. 12/643,760, now published as U.S. Patent Application Publication No. US 2011/0148083.
RCE and Amendment and Response to Office Action in co-pending U.S. Appl. No. 12/643,760, now published as U.S. Patent Application Publication No. US 2011/0148083.
Co-pending U.S. Appl. No. 13/828,092 titled Airbag With Deflector, filed Mar. 14, 2013.

* cited by examiner

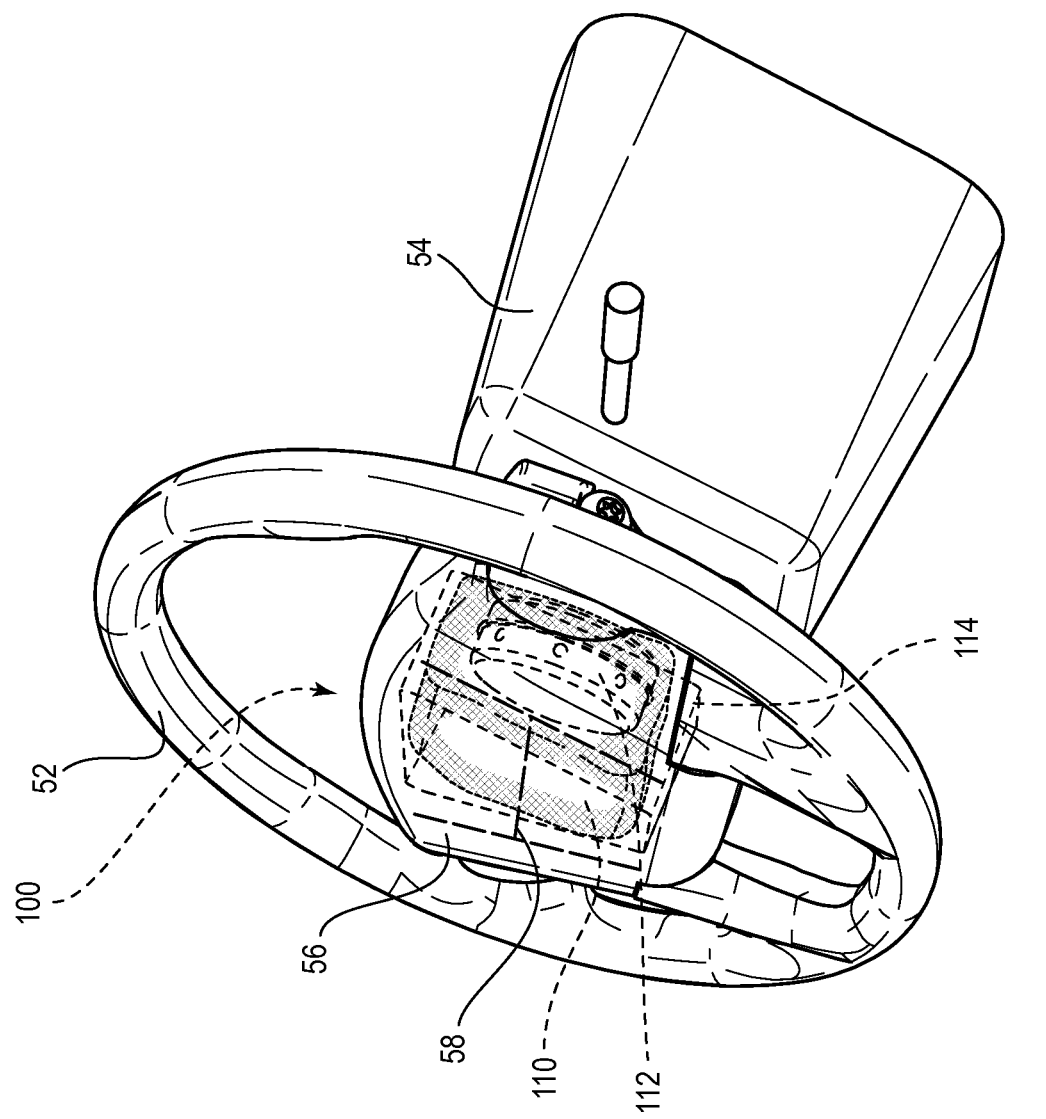

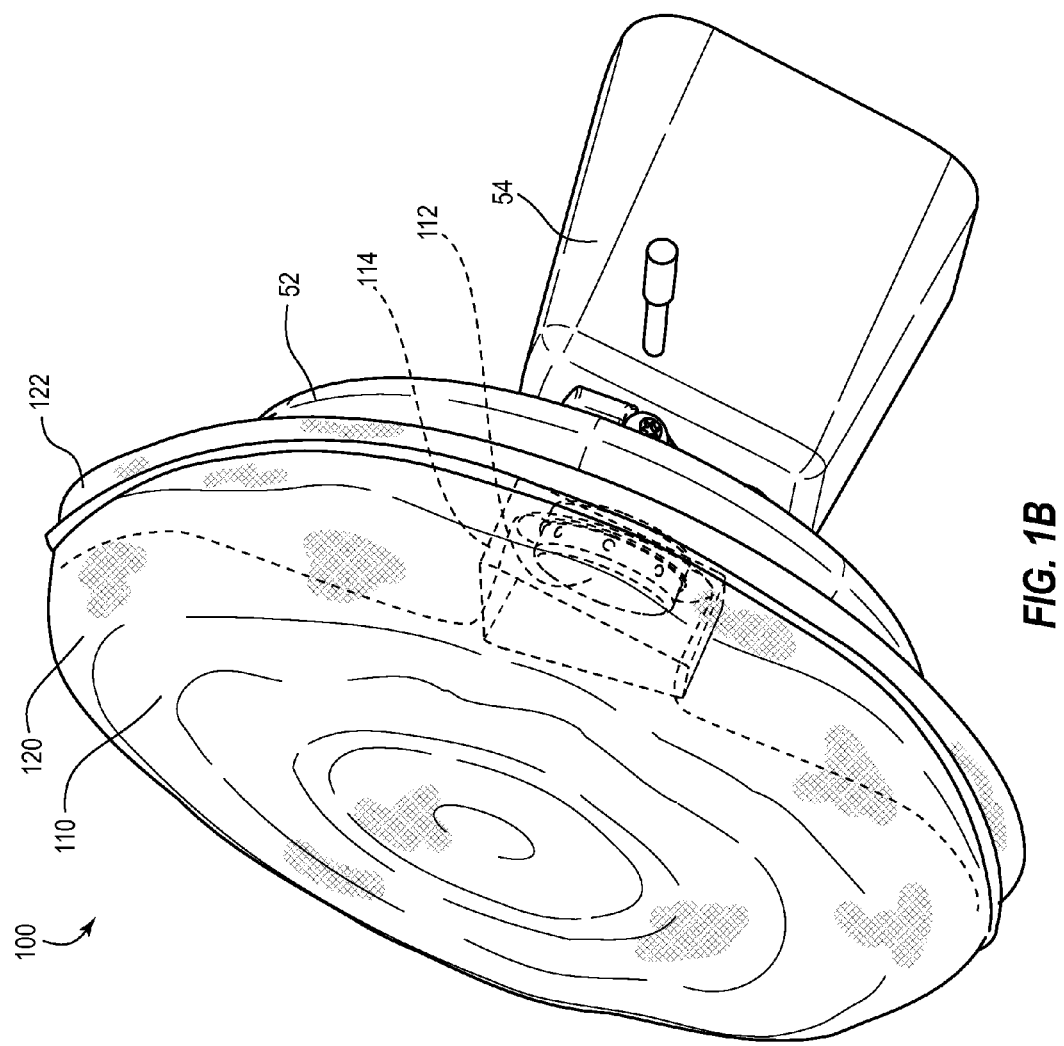

MULTI-CHAMBER DRIVER AIRBAGS

BACKGROUND

Driver airbags are often mounted in a steering wheel and deploy so as to prevent a driver from impacting the steering wheel and/or other vehicular structures in a collision event. In some instances, the airbags can suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1A is a perspective view of an airbag assembly mounted in a steering wheel of a vehicle, wherein the airbag assembly is shown in a packaged configuration;

FIG. 1B is another perspective view of the airbag assembly of FIG. 1A, wherein the airbag assembly is shown in a deployed and inflated configuration;

DETAILED DESCRIPTION

Figure 2:
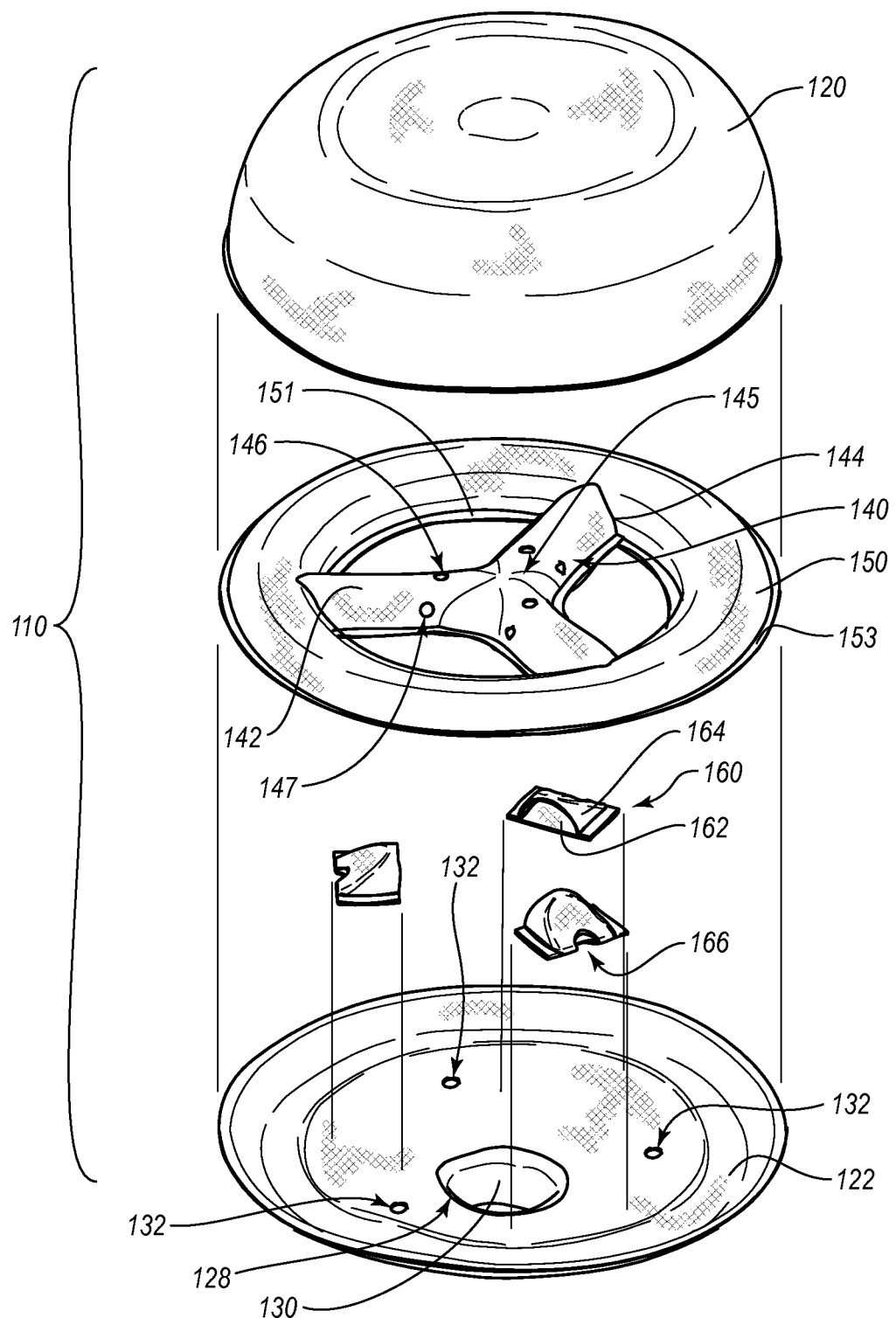
FIG. 2 is an exploded perspective view of an embodiment of an airbag that is compatible with the airbag assembly of FIG. 1A.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" generally refers to an inflatable front airbag, such as a driver airbag, although the principles discussed may apply to other airbag types in other embodiments.

Front airbags are typically installed in the steering wheel and instrument panel of a vehicle. During installation, the airbags are rolled and/or folded, and may be retained in the packaged state behind a cover. During a collision event, an inflator is triggered, which rapidly fills the airbag with inflation gas. Thus, the airbag rapidly changes from a rolled and/or folded configuration (also referred to as a packaged configuration) to an expanded or deployed configuration. For example, the expanding airbag can open the cover (e.g., tear through a burst seam or open a door-like structure) so as to exit a housing. The inflator may be triggered by any suitable device or system, and the triggering may be in response to and/or influenced by one or more vehicle sensors.

Certain embodiments of airbag assemblies that are disclosed herein are particularly well suited for use as driver airbags, and may be mounted in a steering wheel. In some embodiments, an airbag assembly includes an airbag that includes multiple compartments or chambers. A base chamber can be configured to deploy at or near (e.g., adjacent to) the steering wheel, and may interact with the steering wheel or otherwise function to support or brace a cushion chamber, which can be configured to receive the torso and/or the head of a passenger in a collision event. Such an arrangement can stabilize the airbag during a deployment event to ensure that the airbag remains at a position shielding the steering wheel in order to protect a passenger from injurious contact with the steering wheel, and may be capable of doing so in any of a variety of collision scenarios. For example, some embodiments can provide superior positioning and cushioning, as compared with prior art airbags, under the conditions of the Insurance Institute for Highway Safety (IIHS) small overlap frontal crash test.

In some embodiments, the base chamber deploys more quickly than the cushioning chamber. In other or further embodiments, the base chamber may be inflated so as to have a greater pressure than a pressure within the cushioning chamber, at least initially. In further embodiments, the pressure within the base chamber is greater than that in the cushioning chamber throughout an entirety of a deployment event. In some embodiments, the airbag assembly includes one or more one-way valves through which inflation gases are introduced into the base chamber, and the one or more one-way valves can prevent the inflation gases from escaping from the base chamber. Advantages of various embodiments will be evident from the present disclosure.

FIGS. 1A-1B depict airbag assembly 100 in two different configurations. FIG. 1A depicts airbag assembly 100 in a packaged configuration, and FIG. 1B depicts the airbag assembly 100 in a deployed and inflated configuration. FIGS. 1A-1B further depict a steering wheel 52 and a steering column 54 of a vehicle. The steering wheel 52 includes a cover 56, behind which airbag assembly 100 is located. The cover 56 may be of any suitable variety, and may include a tear seam or burst seam 58 through which an airbag can deploy.

The airbag assembly 100 can include an inflatable airbag 110, an inflator 112, and an airbag housing 114. In the illustrated embodiment, the airbag 110 includes a rear panel 120, which in the deployed and inflated configuration is generally directed toward an occupant or an occupant position (e.g., a vehicle seat), and may at least partially define a cabin side of the airbag 110. A front panel 122 is located opposite the rear panel 120. In the illustrated embodiment, the front panel 122 is adjacent to the steering wheel 52 when the airbag 110 is in the deployed and inflated configuration.

Figure 3:
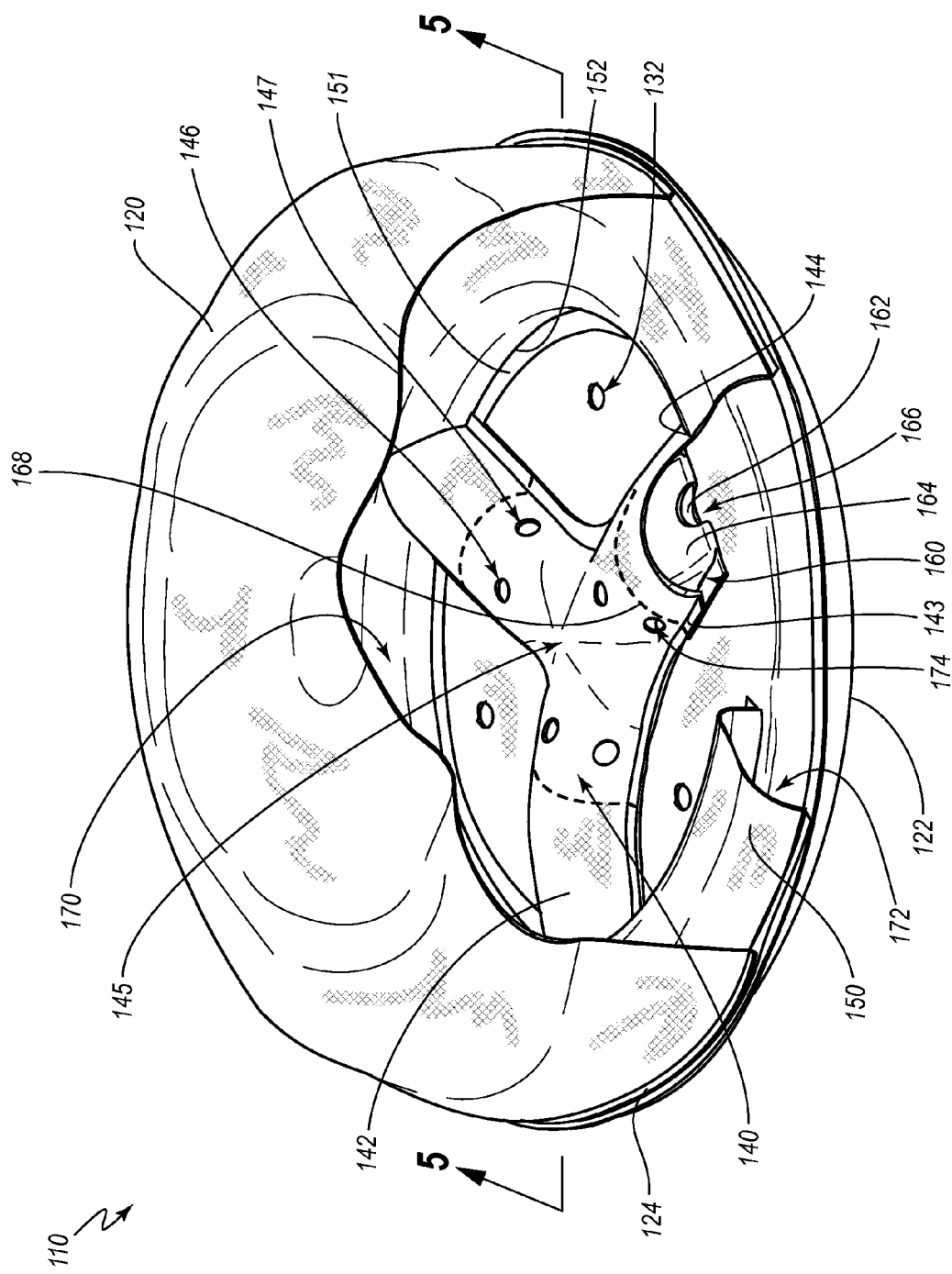
FIG. 3 is a perspective partial cutaway view of the airbag of FIG. 2 in an assembled state.

FIGS. 2 and 3 depict an embodiment of an airbag 110, which may also be referred to as an airbag cushion, that is compatible with the airbag assembly 100 of FIGS. 1A and 1B. The airbag 110 includes the rear panel 120 and the front panel 122, which are joined to each other about their peripheries at a seam 124. The seam 124 may be of any suitable variety, whether sealed or unsealed seams, and may be formed via stitching, one or more adhesives, taping, welding (e.g., radio frequency welding), heat sealing, or any other suitable technique or combination of techniques. The panels 120, 122 may also be referred to as airbag cushion membranes, and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

The rear panel 120 may be configured to expand so as to define a cushion for receiving a head and/or torso of a passenger. In the illustrated embodiment, the rear panel 120 is substantially bowl-shaped when in the inflated configuration, and may be circularly or rotationally symmetric. Any other suitable shape or configuration of the rear panel 120 is contemplated.

In the illustrated embodiment, the front panel 122 defines an opening 128 (see also FIGS. 4 and 5) through which inflation gases can pass into the airbag 110. The airbag 110 can further include a throat 130 that extends from the front panel 122. In various embodiments, the throat 130 may be attached to the front panel 122 or it may be integrally formed therewith.

In some embodiments, the airbag 110 includes one or more vents 132. In the illustrated embodiment, the vents 132 are defined by the front panel 122. The vents 132 can be configured to permit inflation gases to escape from a cushioning chamber 170, which may also be referred to as a cushioning compartment, which can be defined at least in part by the front and rear panels 122, 120, as discussed further below.

Figure 4:
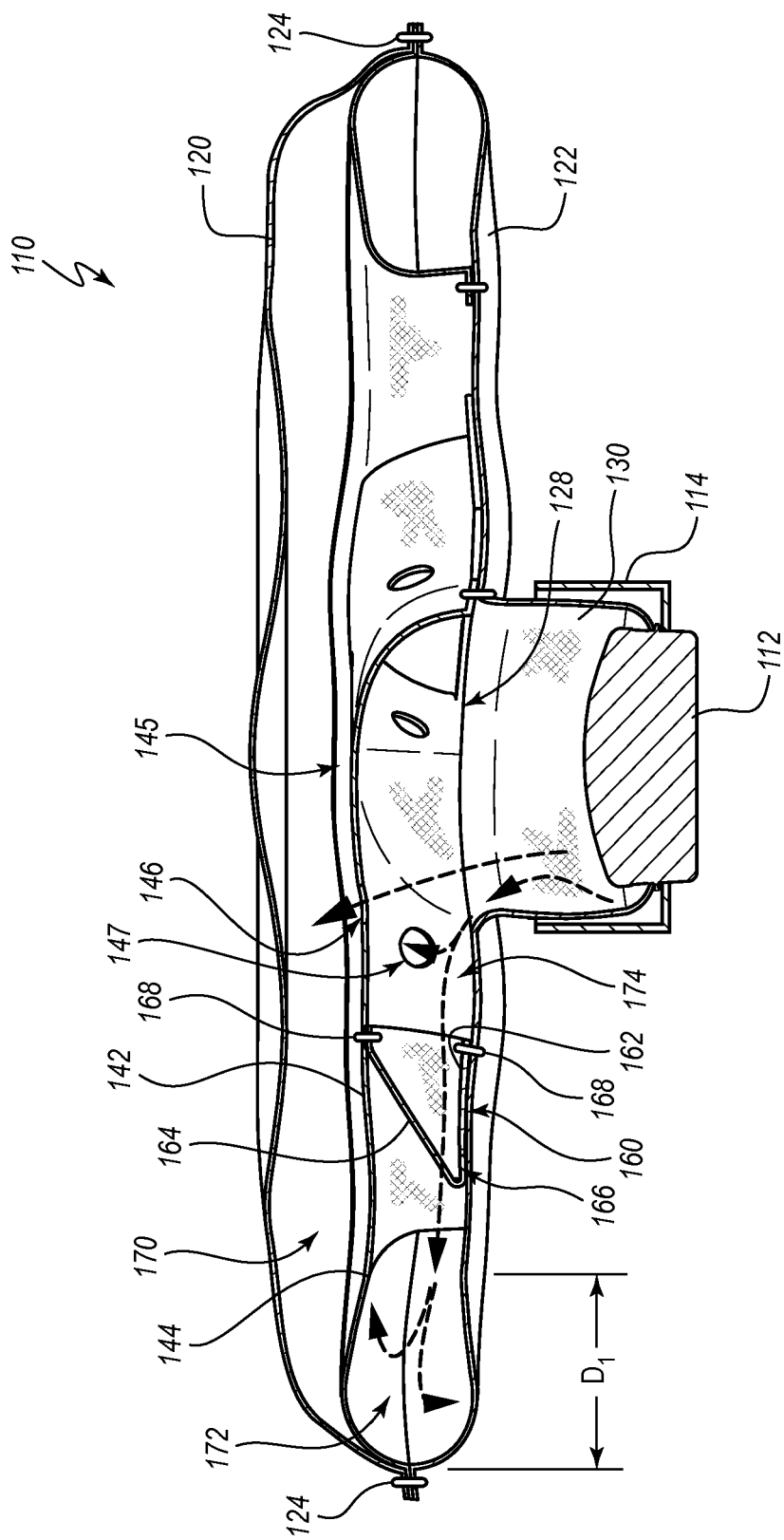
FIG. 4 is a cross-sectional view of the airbag assembly of FIG. 1A in an early stage of inflation.
Figure 5:
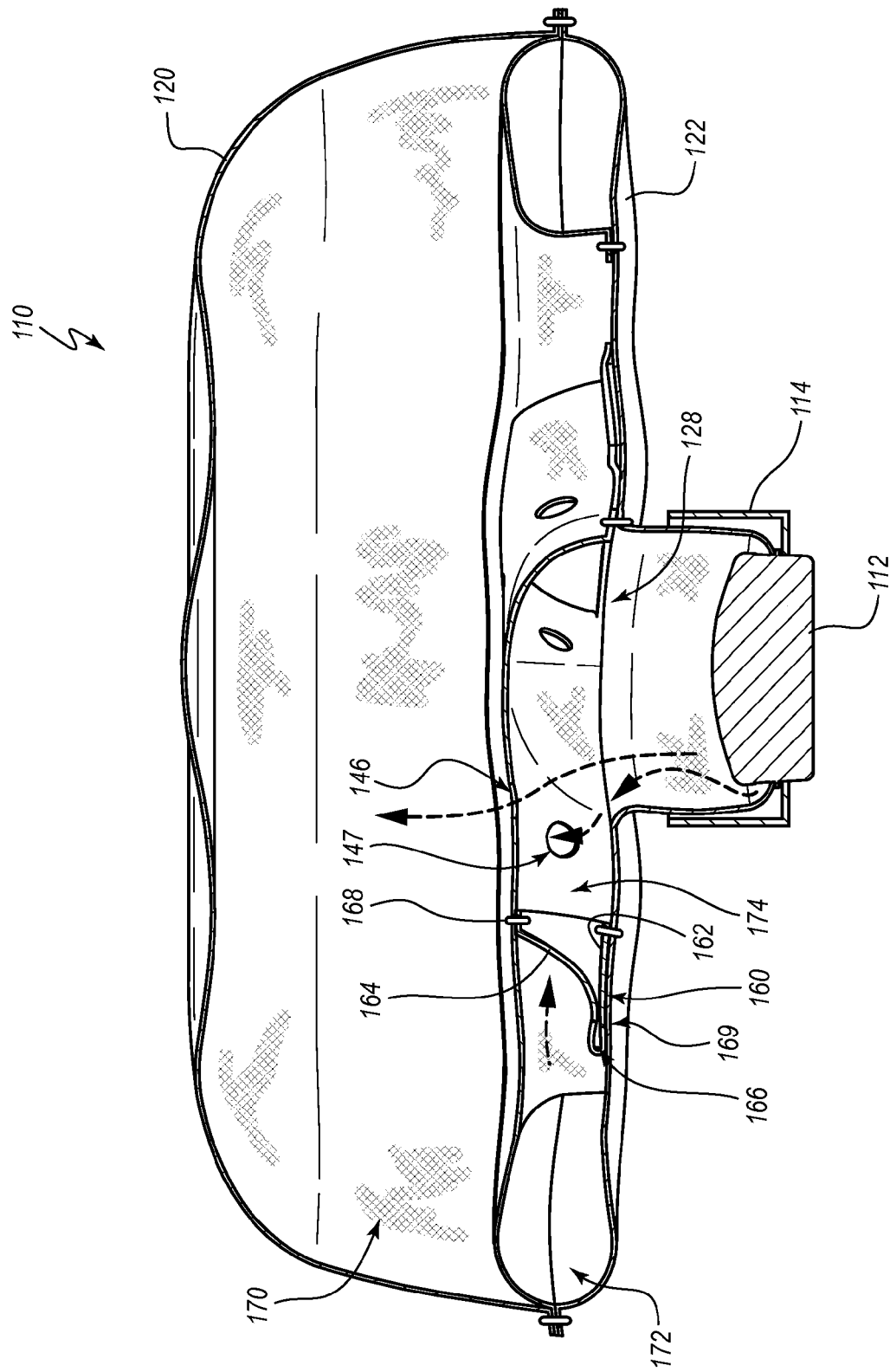
FIG. 5 is a cross-sectional view of the airbag assembly of FIG. 1A taken along a view line such as the view line 5-5 in FIG. 3, wherein the airbag is shown in a later stage of inflation than what is shown in FIG. 4.

In various embodiments, the airbag 110 can include an inflation gas deflector 140, a partition 150, and/or one or more one-way valves 160. As shown in FIG. 3, when the various components of the airbag 110 are assembled, the airbag 110 can include the cushioning chamber 170 and a base chamber 172, which may also be referred to as a base compartment. The cushioning chamber 170 can be defined by interior surfaces of the front and rear panels 122, 120 and by exterior surfaces of the deflector 140 and of the partition 150. The base chamber 172 can be defined by an interior surface of the partition 150. As shown in FIGS. 3-5, an interior surface of the deflector 140 can define an inflation gas routing conduit 174, which may also be referred to as an inflation gas routing channel. The one-way valves 160 can be positioned at least partially within the conduit 174, or at a distal end of one or more of the branches of the conduit 174, and can be configured to permit selective fluid communication between the conduit 174 and the base chamber 172, as discussed further below. In the illustrated embodiment, the conduit 174 includes three branches, each of which is defined by an arm 142 of the deflector.

The illustrated embodiment includes a deflector 140 having three arms 142 that are angularly spaced from one another by equal amounts (i.e., adjacent arms 142 are angularly spaced from each other by about 120 degrees). Other arrangements are also possible. The deflector 140 can be attached to the front panel 122 via a series of seams 143.

The deflector 140 may include a woven nylon material, which in some embodiments, may be coated with one or more materials, such as silicone. The deflector 140 can include a flexible fabric, which may have a stiffness that is equal or roughly equal to that of the front and rear panels 122, 120. In other embodiments, the deflector 140 may include a material that is more rigid than that used for the panels 120, 122, yet is still able to be folded and/or rolled into a packaged configuration. In the depicted embodiment, the arms 142 extend radially outwardly from a central hub 145. The central hub 145 can be positioned directly over the opening 128 of the front panel 122 and directly over the inflator 112. Inflation gases from the inflator 112 thus may initially be directed toward the central hub 145 and may be deflected thereby toward distal ends 144 of the arms 142. As previously mentioned, and as discussed further below, in some embodiments, each arm 142 can be coupled with a one-way valve 160. In some embodiments, the one-way valves 160 are at the distal ends 144 of the arms 142. In other embodiments, the one-way valves 160 are spaced proximally relative to the distal ends 144 of the arms 142 and may be at an interior of the conduit 174 defined by each arm 142. As further discussed below, in other embodiments, the distal ends 144 of the arms 142 may themselves act as one-way valves, such that separate one-way valves 160 are not attached to the arms 142.

With continued reference to FIGS. 2 and 3, the deflector 140 can include one or more vents through which inflation gases can escape from the conduit 174 into the cushioning chamber 170 so as to inflate the cushioning chamber 170. In the illustrated embodiment, the deflector 140 includes top vents 146 and side vents 147. The top vents 146 may be configured such that they direct inflation gas toward front panel 120 of inflatable airbag 110. In one embodiment, the top vents 146 direct inflation gas toward front panel 120 in a direction that is substantially perpendicular to the front panel 120, when the front panel 120 is in a deployed and inflated configuration, such as is depicted in FIGS. 3 and 5. In some embodiments, the top vents 146 may be configured such that the top vents direct inflation gas toward front panel 120 solely in a direction that is substantially perpendicular to the front panel 120, when airbag 110 and front panel 120 are in a deployed and inflated configuration, such as is depicted in FIGS. 3 and 5. The top vents 146 may be positioned at a maximal distance from the front panel 122 when the conduit 174 is inflated, or stated otherwise, at a top region of the deflector 140.

The side vents 147 may be configured to direct inflation gas toward an inwardly facing external surface of the partition 150 and/or toward an interior surface of the rear panel 120 at a position above the partition 150. More generally, the side vents 147 may be positioned so as to direct inflation gas toward a periphery of the airbag 110. The side vents 147 can be positioned at side regions of the arms 142.

In a packaged configuration, the top and side vents 146, 147 may not necessarily be directed toward the front panel 122 and/or the partition 150, respectively. Further, in early stages of airbag deployment, the airbag 110 and deflector 140 may be rolled, folded, and/or wrinkled such that the top and side vents 146, 147 may not be directed toward the front panel 122 and the partition 150, respectively. However, once the deflector 140 is in an inflated configuration, such as depicted in FIGS. 3-5, the top and side vents 146, 147 may direct inflation gas toward what will become the front and peripheral regions of the airbag 110, respectively, once the airbag is in a deployed and inflated configuration.

The arms 142 may be substantially identical to each other, whereas in other embodiments, one or more arms may differ from the one or more remaining arms. In the depicted embodiment, the each of the arms 142 extends to a distance $D_1$ from the perimeter seam 124 (see FIG. 4). In various embodiments, the distance $D_1$ may be within a range of from about 10 mm to about 200 mm. The distance $D_1$ may be the same or different for each arm 142 of the deflector 140.

With continued reference to FIGS. 2 and 3, the material of which the deflector 140 is formed may be larger, or wider, than the spacing between adjacent attachment seams 143. In other words, the material of deflector 140 may not pulled taut by the seams 143, such that the deflector 140 can be inflated to a non-planar shape during airbag deployment. Stated otherwise, due to a greater length of deflector material that is present in an arm 142 of the deflector 140, as compared with a distance between adjacent seams 143 at the edges of the arm 142, when the deflector 140 is viewed in a transverse cross-section that is perpendicular to a longitudinal axis of an arm 142 of the deflector 140, there can be slack in the material of deflector 140, such that even when inflation gas is not passing through the deflector, the arm 142 of the deflector 140 defines a non-planer shape. Other arrangements of the deflector 140 are also possible.

In the illustrated embodiment, the distal end 144 of each arm 142 of the deflector 140 is attached to the partition 150. In some embodiments, the deflector 140 and the partition 150 may each comprise one or more separate pieces that are attached together. In some embodiments, one or more of the deflector 140 and the partition 150 may be formed of a unitary piece of material, and in further embodiments, the deflector 140 and the partition 150 are formed from a unitary piece of material.

An inner rim 151 of the partition 150 can be attached to the front panel 122 via an interrupted seam 152. The seam 152 may be continuous along those regions of the inner rim 151 that do not intersect the arms 142 of the deflector 140. However, at the distal ends 144 of the arms 142, the interrupted seam 152 is discontinuous, such that the seam 152 does not attach the partition 150 to the front panel 122 at the intersection of the deflector 140 and the partition 150. It may be said that the interrupted seam 152 separates or fluidly isolates the cushioning chamber 170 from the base chamber 172, whereas the interrupted seam 152 permits fluid communication between the conduit 174 and the base chamber 172.

As previously noted, the partition 150 can cooperate with the front panel 122 to define the base chamber 172. An outer rim 153 of the partition 150 can be captured between the outer peripheries of the front and rear panels 122, 120 secured by the seam 124. In various embodiments, the partition 150 is formed from the same material, or same type of material, as one or more of the front panel 122 and the deflector 140. In some embodiments, the partition 150 may be capable of retaining inflation gases within the base chamber 172. For example, in some embodiments, the partition 150 is coated with one or more materials, such as silicone.

With continued reference to FIGS. 2 and 3, the one or more one-way valves 160 may be of any suitable variety. In the illustrated embodiment, the airbag 110 includes three one-way valves 160, with each valve coupled with a different arm 142 of the deflector 140. Each one-way valve 160 of the depicted embodiment is formed from a piece of material that is folded over. A lower flap 162 may be sized and configured to lay flat against the lower panel 122, whereas an upper flap 164 may be rounded so as to form a concavity into which inflation gases can be received. An aperture 166 can be provided along the folded end of the one-way valve 160. The upper flap 164 can slope downwardly toward the fold and toward the opening 166. Such a configuration can provide a preferred flow path for inflation gases. In particular, inflation gases traveling in a direction from the edges of the lower and upper flaps 162, 164 toward the fold have a tendency to push upwardly on the upper flap 164 so as to maintain the aperture 166 in an open state and thereby permit the inflation gases to pass through the aperture 166. In contrast, inflation gases at an opposite side of the one-way valve 160 have a tendency to push downwardly on the upper flap 164 so as to constrict or close the valve 160, as discussed further below. The edges of the lower and upper flaps 162, 164 may be said to define an inlet end of the one-way valve 160. The folded end of the material may be said to define an outlet end of the one-way valve 160. In some embodiments, the upper flap 164 is sufficiently slack to allow inflation gas pressure on an upper surface of the upper flap 164 to push downwardly on the upper flap 164 so as to close the valve, as discussed further below.

The upper and lower flaps 164, 162 of a one-way valve 160 can be joined along their lateral ends or edges. In some embodiments, the lateral ends of the flaps 164, 162 of a one-way valve are captured between opposing flanges of an arm 142 of the deflector 140 and the front panel 122. The flaps 164 can be secured via the one or more seams 143 that join the deflector 140 to the front panel 122.

In some embodiments, the upper and/or lower flaps 164, 162 of a one-way valve 160 can be secured to the deflector 140 and/or the front panel 122, respectively. For example, in the illustrated embodiment, one or more stitches 168 are used to secure the upper and lower flaps 164, 162 to the deflector 140 and the front panel 122 (see FIGS. 3 and 4). The stitches 168 can ensure that the lower flaps 164, 162 can initially separate from each other, or open, as the conduit 174 is inflated during deployment of the airbag 110 to thereby permit inflation gases to pass through the one-way valve 160 (e.g., through the opening 166) in a preferred direction.

FIGS. 4 and 5 illustrates different stages of inflation of the airbag 110 during a deployment event. FIG. 4 illustrates an early stage in which inflation gas flows through the conduit 174 and the one-way valve into the base chamber 172, in which the conduit 174 and the base chamber 172 are nearly completely filled with inflation gas, and in which the cushioning chamber 170 is only partially filled with inflation gas that has passed through the conduit 174. FIG. 5 illustrates a later stage in which the base chamber 172 has been completely filled with inflation gas and is no longer in fluid communication with the central portion of the conduit 174, and in which the cushioning chamber 170 has been completely filled with inflation gas.

With reference to FIG. 4, various fluid paths along which inflation gas can travel in deploying the airbag 110 are described. Inflation gas can exit the inflator 112 and pass generally upwardly through the throat 130 of the airbag 110 and through the opening 128 in the front panel 122. Directional terms such as "upwardly" are used here relative to the orientation shown in FIG. 4. Where the housing 114 has been installed in a steering wheel, the "upward" direction may in fact be in a primarily rearward, and possibly upward, direction relative to the vehicle. The inflation gas can proceed toward the central hub 145 of the deflector 140 and can be deflected outwardly toward the one-way valves 160. The inflation gas thus can inflate the deflector 140. Depending on the configuration of the deflector 140 (e.g., deflector shape, size and positions of the vents 146, 147), a majority of the deflected inflation gas can proceed through the conduit 174, through the one-way valves 160, and into the base chamber 172. In certain cases, the fluid path thus can proceed from the inflator 112, to the deflector 140, and then into the base chamber 172 without proceeding through the cushioning chamber 170. With respect to other fluid paths, some of the deflected inflation gas can proceed from the conduit 174 through the vents 146, 147 and into the cushioning chamber 170 to begin inflating the cushioning chamber 170. In the illustrated embodiment, the base chamber 172 fills more rapidly than the cushioning chamber 170.

With reference to FIG. 5, when the base chamber 172 has been completely filled and reaches a sufficient pressure, which may be a predetermined pressure, the one-way valve 160 can close. In the illustrated embodiment, the one-way valves 160 closes when the pressure within the base chamber 172, which acts on the upper surface of the upper flap 164, exceeds the pressure within the conduit 174, which acts on the lower surface of the upper flap 164, by an amount sufficient to bring the upper flap 164 in close proximity or contact with the lower flap 162. For example, in the illustrated embodiment, the upper flap 164 forms a seal 169 with the lower flap 162 that is capable of preventing inflation gas from passing through the seal 169. Other arrangements of the one-way valves 160 are also possible. With the one-way valves 160 closed, additional inflation gas that enters the conduit 174 from the inflator 112 is channeled through the vents 146, 147 of the deflector 140 into the cushioning chamber 170 to continue filling the cushioning chamber 170.

In various embodiments, the base chamber 172 is configured to fill quickly, or at least more rapidly than the cushioning chamber 170. In other or further embodiments, the base chamber 172 is filled to a pressure that is greater than a pressure that is reached in the cushioning chamber 170. In other or further embodiments, the pressure in the base chamber 172 is maintained during an deployment event. For example, the one-way valves 160 can terminate fluid communication between the base chamber 172 and at least a portion of the conduit 174 when a desired pressure has been reached. Inflation gas thus may be retained within the base chamber 172. It may also be said that when the one-way valves 160 are open, fluid communication is present between the base chamber 172 and the cushioning chamber 170, whereas when the one-way valves 160 are closed, fluid communication is prevented between the base chamber 172 and the cushioning chamber 170. For example, when the one-way valves 160 are open, it is possible for inflation gas to pass from the cushioning chamber 170 to the base chamber 172, although such a fluid path is not likely to be followed by gas that is delivered at high velocity from the inflator 112, and when the one-way valves 160 are closed, gas is prevented from passing from one of the chambers 170, 172 to the other chamber 170, 172. In certain embodiments, such as that depicted in FIG. 5, even when the one-way valve 160 is closed, the inlet end of the one-way valve 160 is in fluid communication with the central region of the conduit 172, as well as with the cushioning chamber 170 (via the vents 146, 147), and the outlet end of the one-way valve 160 is in fluid communication with the base chamber 172.

The base chamber 172 can be adjacent to the steering wheel 52 when the airbag 110 is in the deployed and inflated orientation. For example, in the embodiment illustrated in FIG. 1B, the base chamber 172 is positioned directly above the steering wheel 52 when the airbag 110 is deployed, and the front panel 122 may contact the steering wheel 52. As can be appreciated by simultaneous reference to FIGS. 1B, 4 and 5, the base chamber 172 can be sufficiently wide in a radial direction to cover the steering wheel 52, which may have a smaller radial width. Stated other otherwise, the base chamber 172 can be configured to rest on a surface of the steering wheel 52, and can extend along a full circumference of the steering wheel, when the airbag 110 is deployed. An outermost diameter of the base chamber 172 can exceed an outermost diameter of the steering wheel 52. With reference to FIG. 4, in some embodiments, the region demarcated by the distance $D_1$ can span the steering wheel 52, or stated otherwise, can extend from a radial interior position to a radial exterior position relative to the steering wheel 52. In some embodiments, the base chamber 172 may extend radially inwardly to a greater extent than the base chamber 172 depicted in FIGS. 1B, 4, and 5. For example, in some embodiments, the base chamber 172 may extend inwardly toward and/or up to the opening 128 in the front panel 122.

In other or further embodiments, the base chamber 172 may be deployed adjacent to the steering wheel 52, but may not necessarily be at a position directly above, over, on top of, or in contact with the steering wheel 52. For example, in some embodiments, an inner rim of the base chamber 172 may be at a position that is spaced radially outwardly from an outer rim of the steering wheel 52. The base chamber 172 may nevertheless be termed as "adjacent" to the steering wheel 52. The cushioning chamber 170, for example, can extend toward an occupant position of the vehicle to a greater extent than does the base chamber 172, as can be seen in FIG. 1B. In various embodiments, the base chamber 172 can act to stiffen the front panel 122. For example, when the base chamber 172 is filled and pressurized (e.g., as pressure within the base chamber 172 increases), the base chamber 172 may pull the central portion of the front panel 122 taut. In any of the foregoing arrangements, the base chamber 172 can act as a support or base for the cushioning chamber 170. For example, the base chamber 172 (which may be at least partially defined by the front panel 122, in some embodiments), can directly rest on or otherwise interact with the steering wheel 52 to restrain movement of the airbag 110 relative to the steering wheel 52. In other arrangements, such as where the base chamber 172 may not itself directly rest on the steering wheel 52 (e.g., where a diameter of the base chamber 172 is larger than a diameter of the steering wheel), the base chamber 172 can provide a base (such as by tightening the front panel 122) to restrain movement of the airbag 110 relative to the steering wheel 52.

In some embodiments, the partition 150 and the base chamber 172 can be circularly symmetrical. For example, in the embodiment depicted in FIGS. 2-5, the partition 150 and the base chamber 172 at least partially defined thereby are substantially shaped as a toroid.

Figure 6:
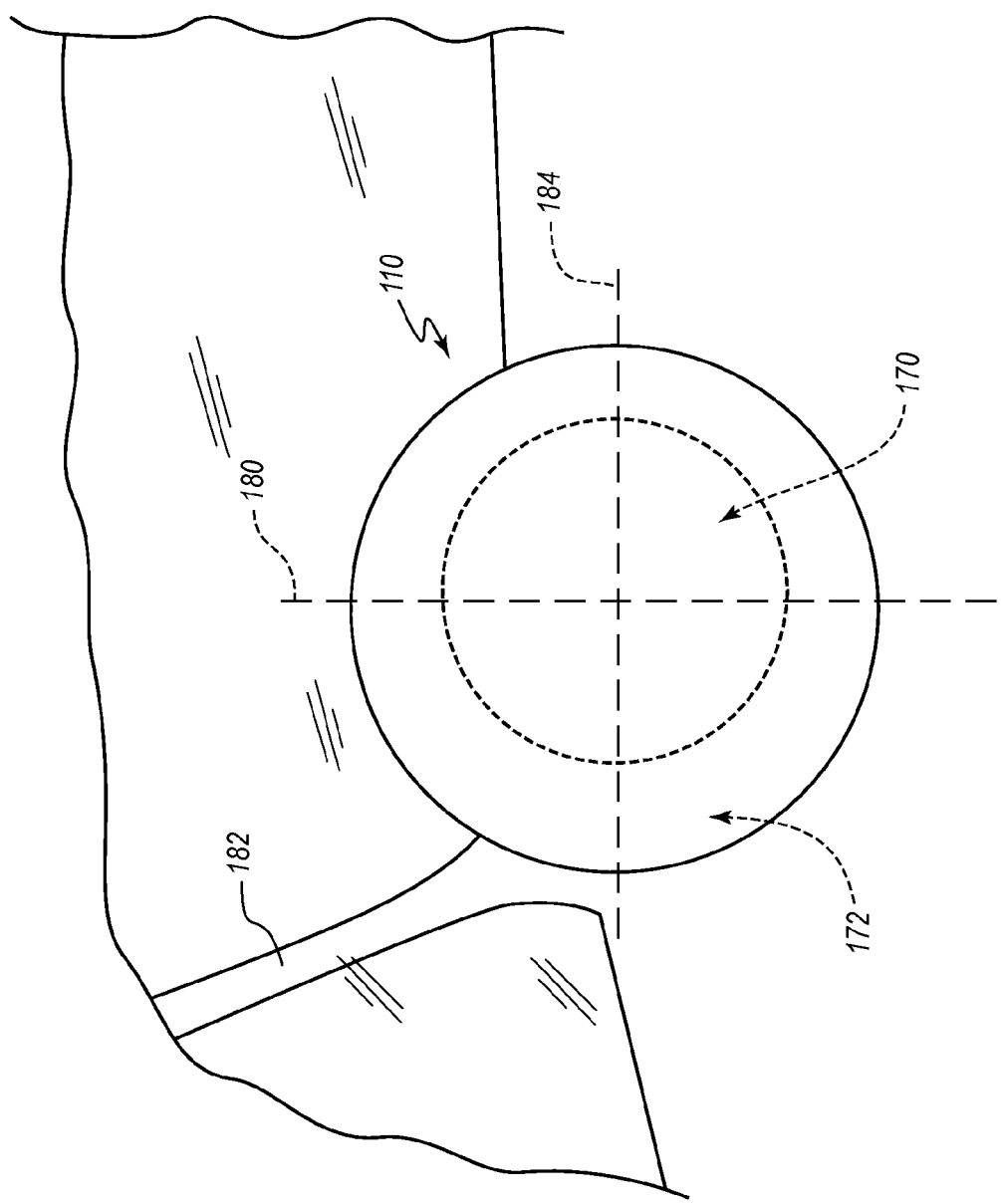
FIG. 6 is a plan view of another embodiment of an airbag assembly mounted within a vehicle and shown in a deployed and inflated configuration.

In other embodiments, the partition 150 and/or the base chamber 172 can be asymmetrical. For example, with reference to FIG. 6, in some embodiments, the base chamber 172 is asymmetrical relative to a vertical plane 180 that passes through a portion of the airbag 110 at which inflation gas enters the airbag (e.g., the opening 128 shown in FIGS. 2, 4, and 5). In some embodiments, a portion of the volume of the base chamber 172 that is configured to be on the side of the plane 180 that is closest to an A-pillar 182 of the vehicle when the airbag is installed in the vehicle and inflated is greater than a remaining volume of the base chamber 172 that is on the other side of the plane 180. In further embodiments, such as that depicted in FIG. 6, the base chamber 172 can be symmetrical relative to a lateral plane 184. The vertical and lateral planes 180, 184 are shown relative to a plan view of the inflated airbag 110, with the lateral plane 180 shown in a horizontal orientation. When the airbag 110 is installed in a vehicle, the vertical plane 180 may remain vertical, whereas the lateral plane 184 may be rotated somewhat, depending on the orientation of the steering wheel 52. For example, in the embodiment shown in FIG. 1B, the lateral plane 184 would slope downwardly from left to right. Any suitable asymmetry of the base chamber 172 is possible, depending on performance characteristics. For example, in some embodiments, a greater volume may be desirable in at least the lower right quadrant shown in FIG. 6, which may aid in stabilizing the airbag 110 relative to the upper left quadrant, which may be closest to the A-pillar in some arrangements. In other embodiments, a greater volume may be desirable in at least the upper left quadrant shown in FIG. 6, which may aid in stabilizing the airbag 110 relative to the upper left quadrant.

Other arrangements for the base chamber 172 are also possible. For example, in some embodiments, the base chamber 172 may extend about only a portion of a periphery of the airbag 110, rather than about its entire periphery as shown in FIGS. 2 and 3. In other or further arrangements, the base chamber 172 may be spaced radially inwardly relative to the periphery of the airbag 110, and thus may not be positioned at the periphery of the airbag 110. In other or further embodiments, an inner wall of the partition 150 may border, touch, and/or be common to a greater portion of an outer wall of the deflector 140 than that shown in FIGS. 2 and 3, up to and including bordering, touching, and/or being common to an entirety of an outer wall of the deflector 140. For example, in the embodiment illustrated in FIGS. 2 and 3, an inner wall of the partition 150 can border an entirety of each of the outer surfaces of the arms 142 of the deflector 140. In other or further embodiments, the base chamber 172 may comprise one or more individual chambers, which may be formed by one or more separate partitions 150. For example, rather than a continuous base chamber 172 that extends about a full periphery of the airbag 110, such as shown in FIGS. 2 and 3, the airbag 110 may include two or more, three or more, or any other suitable number of base chamber 172 that are isolated from one another and are positioned at restricted portions of the front panel 122. In certain of such embodiments, each separate chamber may be coupled with and inflated via its own one-way valve 160.

The cushioning chamber 170 can be adjacent to the base chamber 172, as shown in FIG. 5. In various embodiments, one or more fill patterns and/or fill characteristics of the base chamber 172, which are discussed in the preceding paragraphs, can allow the base chamber 172 to support and/or stabilize the cushioning chamber 170. The cushioning chamber 170, thus stabilized, may readily receive a vehicle occupant during a collision event. For example, the cushioning chamber 170 can be prevented from shifting toward a side of the steering wheel 52 so as to leave an opposite side (e.g., the A-pillar side) of the steering wheel exposed, and/or to prevent the airbag 110 from rolling around the steering wheel. The cushioning chamber 170 may cushion the vehicle occupant and deflate (e.g., via the vents 132 shown in FIG. 3) with desired ride down properties. For example, in some arrangements, the stabilized cushioning chamber 170 can slow down a passenger with a reduced or eliminated risk of the passenger slipping off of the airbag at a side of the airbag (e.g., at the A-pillar side).

In various embodiments, the base chamber 172 is configured to be filled with inflation gas to a first volume and the cushioning chamber 170 is configured to be filled with inflation gas to a second volume that is greater than the first volume. The base chamber 172 can be configured to be filled faster than the cushioning chamber 170 to provide a stabilizing base for the cushioning chamber 170. In some embodiments, a faster fill rate for the base chamber 172 is achieved via larger openings 166, as compared with the vents 146, 147 and/or via vents 146, 147 that are radially spaced from the central hub 145 such that inflation gas is channeled through the conduit 174 such that the inflation gas preferentially is directed through the openings 166, rather than through the vents 146, 147. Stated otherwise, the deflector 140 may be configured to, at least initially during a deployment event, direct a greater amount of inflation gas to the base chamber 172, as compared with the amount of inflation as directed to the cushioning chamber 174. Any other suitable arrangements are possible for achieving desired fill rates for the base chamber 172 and the cushioning chamber 170.

As can be appreciated from the foregoing, in certain embodiments, an airbag 110 can include a first chamber and a second chamber that can be in selective fluid communication with each other. The first chamber can be positioned at, over, or otherwise adjacent to the steering wheel. The first chamber can provide lateral and/or longitudinal (e.g., vertical) stability to the airbag. The airbag can include a one-way valve that can permit the first chamber to have a higher pressure (e.g., significantly higher pressure) than the second chamber and/or the remainder of the airbag. Embodiments of the airbag can be particularly well suited for providing support to an occupant's head where lateral motion of the head (e.g., toward an A-pillar) is present.

The airbag 110 may be manufactured using a variety of techniques such as one piece weaving, "cut and sew", or a combination thereof. Further, the cushion membrane may be manufactured using sealed or unsealed seams, wherein the seams are formed by stitching, adhesive, taping, radio frequency welding, heat sealing, or any other suitable technique or combination of techniques.

A variety of types and configurations of deflectors 140 are also contemplated. For example, the size, shape, and proportions of the deflector 140 may vary from the embodiment depicted in FIGS. 2-5. For example, the deflector 140 in FIGS. 2-5 includes three arms, and may be termed as Y-shaped. In other embodiments, the deflector 140 may have a single arm, and may be I-shaped. In still other embodiments, the deflector 140 may have two arms that extend away from each other at any desired angle. In still other embodiments, the deflector 140 may have four arms, and it may be X-shaped. Any suitable number and arrangement of arms is possible. Moreover, in some embodiments, one or more arms of the deflector 140 may not be coupled with the partition 150 and/or the base chamber 170. For example, in some embodiments, a distal end 144 of one or more deflector arms 142 may be joined directly to the front panel 122 and sealed thereto. In other or further embodiments, a distal end 144 of one or more deflector arms 142 may define a distal aperture through which inflation gas can be delivered into the cushioning chamber 170. The number, shape, configuration, and/or gas channeling properties of the deflector 140 can be adjusted as desired to achieve a desired fill pattern for the airbag 110.

Figure 7:
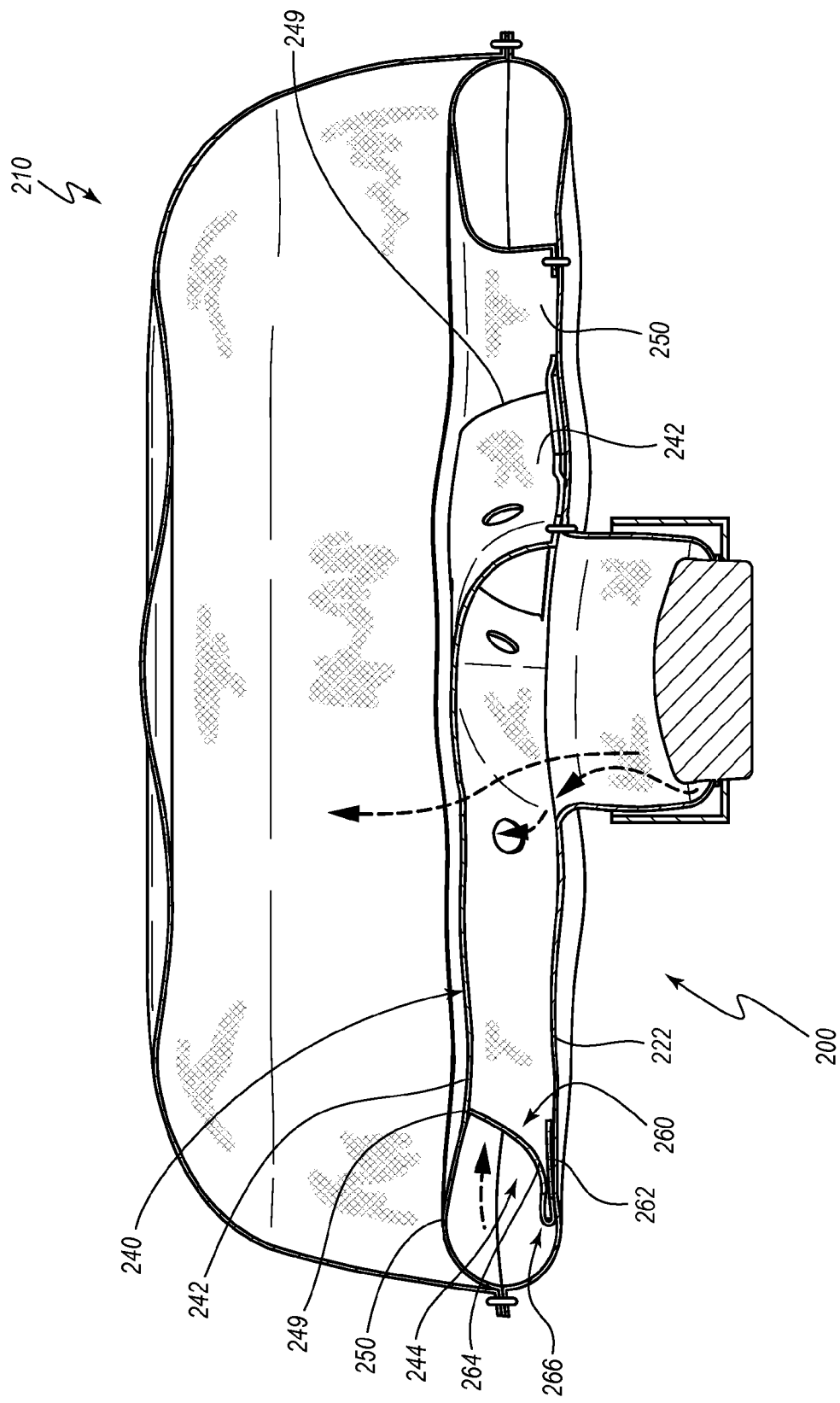
FIG. 7 is a cross-sectional view of another embodiment of an airbag assembly shown in an inflation stage such as that depicted in FIG. 5.

FIG. 7 depicts another embodiment of an airbag assembly 200 that can resemble the airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag assembly 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200. Any suitable combination of the features and variations of the same described with respect to the airbag assembly 100 can be employed with the airbag assembly 200, and vice versa. This pattern of disclosure applies equally to further embodiments depicted in subsequent figures and described hereafter, wherein the leading digits may be further incremented.

The airbag assembly 200 can include an airbag 210. The airbag 210 can include a deflector 240 and one or more one-way valves 260 that differ from the deflector 140 and the one-way valves 160 discussed above. In particular, the one-way valves 260 can be integrally formed with the deflector 240. The deflector 240 can include deflector arms 242, and each deflector arm 242 can include a one-way valve 260 at the distal end 244 of the deflector arm 242. The one-way valve 260 can be formed from a distal region of the material that is used to form the deflector arm 242. In particular, the distal region can include an upper flap 264 and a lower flap 262. The lower flap 262 can be folded under the upper flap 264, and the upper and lower flaps 262 can be joined to a front panel 222 of the airbag 210 via seams (not shown), such as the seams 143 discussed above with respect to FIG. 3. A proximal end of the upper flap 264 may be attached to a partition 250 via any suitable seam 249. The one-way valve 260 can include an opening or aperture 266. The one-way valve 260 can otherwise operate in the same manner as discussed above with respect to the one-way valve 160.

Figure 8:
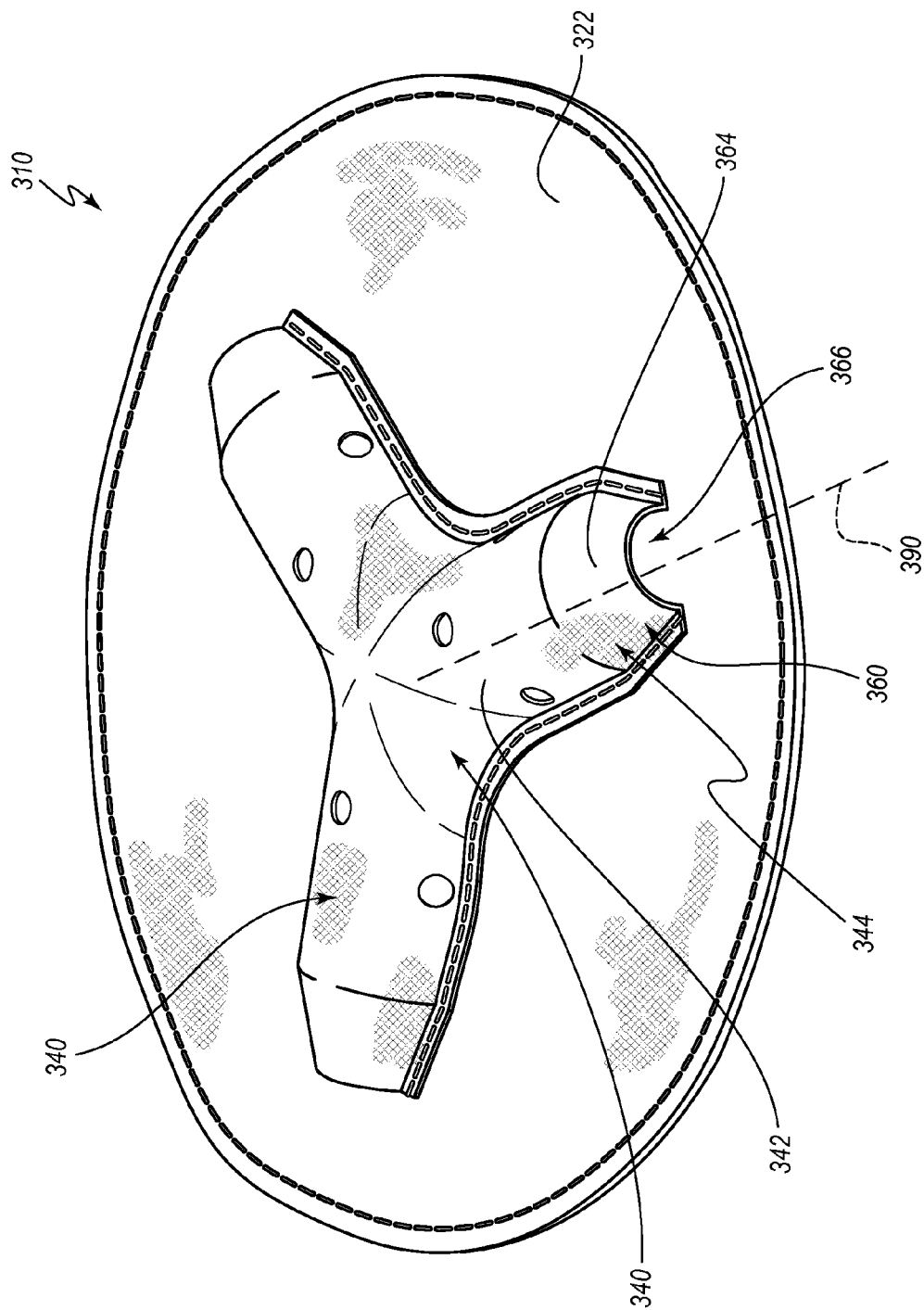
FIG. 8 is a perspective view of a portion of another embodiment of an airbag that is suitable for use with further embodiments of airbag assemblies that are depicted in any of the prior drawings.

FIG. 8 depicts a portion of another embodiment of an airbag 310. A partition and rear panel are not shown, but such components may be similar to the partitions 150, 250 and the rear panel 120 discussed above. The airbag 310 includes a deflector 340 attached to a front panel 322. The airbag 310 further includes one-way valves 360 each having a structure somewhat different from the one-way valves 160, 260 discussed above. In particular, rather than employing a folded over piece of material, each one-way valve 360 includes a piece of material that is configured to collapse when the pressure within a base chamber is sufficiently high. In particular, the deflector 340 includes arms 342, each of which defines a different longitudinal axis 390. At a position at which each arm 342 would be attached to a partition (such as the partition 150 discussed above), the arm 342 begins to narrow, or decrease in a transverse cross-sectional area, in a distal direction. Stated otherwise, a distal end 344 of each arm 342 is funnel shaped. The distal edge of the arm 342 can define an opening 366, such as the openings 166, 266 discussed above. The funnel-shaped region of the arm material thus may act as an upper flap 364 that can collapse under increased pressure so as to close the one-way valve 360. Any other suitable arrangements of one-way valves are contemplated.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. A driver airbag configured to be deployed from a steering wheel of a vehicle, the airbag comprising:
 a first inflatable chamber configured to be deployed adjacent to the steering wheel;
 a second inflatable chamber configured to be deployed adjacent to the first inflatable chamber to extend toward an occupant position of the vehicle to a greater extent than does the first inflatable chamber when the first and second inflatable chambers are inflated; and
 a one-way valve that permits inflation gas to enter the first inflatable chamber to fill the first inflatable chamber during deployment of the airbag, wherein the one-way valve prevents fluid communication between the first and second inflatable chambers when the one-way valve is closed,
 wherein the one-way valve has an inlet end in fluid communication with the second inflatable chamber and an outlet end in fluid communication with the first inflatable chamber.

2. The airbag of claim 1, wherein the one-way valve is configured to close when the first inflatable chamber has been filled with inflation gas to a predetermined pressure.

3. The airbag of claim 1, wherein the one-way valve is configured to yield a higher pressure within the first inflatable chamber as compared with a pressure within the second inflatable chamber during at least an initial stage of deployment of the airbag.

4. The airbag of claim 1, wherein the first inflatable chamber is configured to be filled with inflation gas to a first volume and the second inflatable chamber is configured to be filled with inflation gas to a second volume that is greater than the first volume, and wherein the first inflatable chamber is configured to be filled faster than the second inflatable chamber to provide a stabilizing base for the second inflatable chamber.

5. The airbag of claim 1, further comprising a partition separating at least a portion of the first and second inflatable chambers from each other, wherein the partition prevents inflation gas from passing therethrough from either of the first and second inflatable chambers to the other of the first and second inflatable chambers.

6. The airbag of claim 5, wherein the partition comprises an interrupted seam positioned between the first and second inflatable chambers, wherein the interrupted seam encircles an opening in the airbag through which inflation gas is introduced into the airbag, and wherein portions of the seam that are not interrupted prevent inflation gas from passing therethrough.

7. The airbag of claim 5, further comprising a front panel and a rear panel that cooperate to define at least a portion of each of the first and second inflatable chambers, wherein the partition comprises a separate piece of material that is joined to the front and rear panels.

8. The airbag of claim 1, further comprising a deflector that redirects inflation gas to fill the first inflatable chamber before fully filling the second inflatable chamber.

9. The airbag of claim 1, further comprising a deflector that is in fluid communication with each of the first and second inflatable chambers and is positioned to receive inflation gas from an inflator, and wherein the deflector is configured to at least initially direct a greater amount of inflation gas to the first inflatable chamber as compared with the second inflatable chamber.

10. The airbag of claim 9, wherein the deflector comprises one or more arms that extend radially outwardly relative to a portion of the airbag at which inflation gas enters the airbag, and wherein the ends of the one or more arms are in fluid communication with the first inflatable chamber to permit inflation gas to exit the arms into the first inflatable chamber.

11. The airbag of claim 10, wherein at least one of the one or more arms comprise one or more vents through which inflation gas can pass into the second inflatable chamber.

12. The airbag of claim 1, further comprising a front panel and a rear panel that cooperate to form at least a portion of each of the first and second inflatable chambers, wherein the front panel is configured to contact the steering wheel and the rear panel is configured to receive a torso of a driver when the airbag is deployed.

13. The airbag of claim 12, wherein the rear panel defines an opening through which inflation gas passes after the inflation gas has exited an inflator, and wherein the first chamber is spaced from and encompasses the opening.

14. The airbag of claim 1, wherein the first chamber is asymmetrical to provide greater support to the second chamber at a position closest to an A-pillar of the vehicle when the airbag is deployed, as compared to a position that is furthest from the A-pillar of the vehicle.

15. The airbag of claim 14, wherein the first chamber is asymmetrical relative to a vertical plane that passes through a portion of the airbag at which inflation gas enters the airbag, and wherein a portion of the volume of the first chamber that is configured to be on the side of the plane that is closest to an A-pillar of the vehicle when the airbag is installed in the vehicle and inflated is greater than a remaining volume of the first chamber that is on the other side of the plane.

16. The airbag of claim 1, wherein the first inflatable chamber is configured to rest against the steering wheel to form a base for the second inflatable chamber, and wherein the first inflatable chamber extends outwardly beyond a periphery of the steering wheel.

17. The airbag of claim 1, wherein a first fluid path along which inflation gas can enter the first inflatable chamber extends from an opening in the airbag through which inflation gas is introduced into the airbag to the first inflatable chamber without passing through the second inflatable chamber, and wherein a second fluid path along which inflation gas can enter the second inflatable chamber extends from the opening in the airbag through which inflation gas is introduced into the airbag to the second inflatable chamber without passing through the first inflatable chamber.

18. The airbag of claim 17, wherein at least a portion of each of the first and second fluid paths extend through a conduit that is defined at least in part by a deflector.

19. The airbag of claim 1, wherein the first inflatable chamber is devoid of vents and the second inflatable chamber comprises a vent through which inflation gas can exit the second inflatable chamber.

20. The airbag of claim 1, further comprising a panel configured to contact the steering wheel when the airbag is deployed, wherein the first inflatable chamber is configured to stiffen the panel as pressure within the first inflatable chamber increases.

21. The airbag of claim 1, wherein the first chamber is configured to be fully inflated prior to full inflation of the second chamber, and wherein the one-way valve is configured to close before the second inflatable chamber is fully inflated.

22. A driver airbag comprising:
a first inflatable chamber;
a second inflatable chamber configured to be deployed adjacent to the first inflatable chamber;
a deflector positioned to receive inflation gas from an inflator and to redirect a portion of inflation gas to each of the first and second inflatable chambers, wherein the deflector comprises one or more arms that extend radially outwardly relative to a portion of the airbag at which inflation gas enters the airbag, wherein the ends of the one or more arms are in fluid communication with the first inflatable chamber to permit inflation gas to exit the arms into the first inflatable chamber, and wherein the one or more arms comprise the one-way valve; and
a one-way valve configured to prevent fluid communication between the first and second inflatable chambers when the one-way valve is closed.

23. The airbag of claim 22, wherein the airbag is configured to be deployed from a steering wheel of a vehicle, and wherein the first inflatable chamber is configured to rest against the steering wheel when inflated.

24. The airbag of claim 22, wherein the deflector is positioned to receive inflation gas from an inflator, and wherein the deflector is configured to at least initially direct a greater amount of inflation gas to the first inflatable chamber as compared with the second inflatable chamber.

25. The airbag of claim 22, wherein at least one of the one or more arms comprise one or more vents through which inflation gas can pass into the second inflatable chamber.

26. The airbag of claim 22, wherein a first fluid path along which inflation gas can enter the first inflatable chamber extends from an opening in the airbag through which inflation gas is introduced into the airbag to the first inflatable chamber without passing through the second inflatable chamber, and wherein a second fluid path along which inflation gas can enter the second inflatable chamber extends from the opening in the airbag through which inflation gas is introduced into the airbag to the second inflatable chamber without passing through the first inflatable chamber.

27. An airbag assembly comprising:
- a housing configured to be mounted to a steering wheel of a vehicle;
- an inflator coupled to the housing; and
- an airbag coupled with the inflator and packaged in the housing, the airbag comprising:
  - a first inflatable chamber configured to be deployed adjacent to the steering wheel;
  - a second inflatable chamber configured to be deployed adjacent to the first inflatable chamber to extend toward an occupant position of the vehicle to a greater extent than does the first inflatable chamber when the first and second inflatable chambers are inflated; and
  - a one-way valve that permits inflation gas to enter the first inflatable chamber to fill the first inflatable chamber during deployment of the airbag, wherein the one-way valve prevents fluid communication between the first and second inflatable chambers when the one-way valve is closed,
  - wherein the one-way valve has an inlet end in fluid communication with the second inflatable chamber and an outlet end in fluid communication with the first inflatable chamber.

28. A driver airbag configured to be deployed from a steering wheel of a vehicle, the airbag comprising:
- a first inflatable chamber configured to be deployed adjacent to the steering wheel;
- a second inflatable chamber configured to be deployed adjacent to the first inflatable chamber to extend toward an occupant position of the vehicle to a greater extent than does the first inflatable chamber when the first and second inflatable chambers are inflated; and
- a one-way valve that permits inflation gas to enter the first inflatable chamber to fill the first inflatable chamber during deployment of the airbag, wherein the one-way valve prevents fluid communication between the first and second inflatable chambers when the one-way valve is closed,
- wherein the first chamber is asymmetrical to provide greater support to the second chamber at a position closest to an A-pillar of the vehicle when the airbag is deployed, as compared to a position that is furthest from the A-pillar of the vehicle.

29. The airbag of claim 28, wherein the first chamber is asymmetrical relative to a vertical plane that passes through a portion of the airbag at which inflation gas enters the airbag, and wherein a portion of the volume of the first chamber that is configured to be on the side of the plane that is closest to an A-pillar of the vehicle when the airbag is installed in the vehicle and inflated is greater than a remaining volume of the first chamber that is on the other side of the plane.

30. A driver airbag configured to be deployed from a steering wheel of a vehicle, the airbag comprising:
- a first inflatable chamber configured to be deployed adjacent to the steering wheel;
- a second inflatable chamber configured to be deployed adjacent to the first inflatable chamber to extend toward an occupant position of the vehicle to a greater extent than does the first inflatable chamber when the first and second inflatable chambers are inflated; and
- a one-way valve that permits inflation gas to enter the first inflatable chamber to fill the first inflatable chamber during deployment of the airbag, wherein the one-way valve prevents fluid communication between the first and second inflatable chambers when the one-way valve is closed,
- wherein a first fluid path along which inflation gas can enter the first inflatable chamber extends from an opening in the airbag through which inflation gas is introduced into the airbag to the first inflatable chamber without passing through the second inflatable chamber,
- wherein a second fluid path along which inflation gas can enter the second inflatable chamber extends from the opening in the airbag through which inflation gas is introduced into the airbag to the second inflatable chamber without passing through the first inflatable chamber, and
- wherein at least a portion of each of the first and second fluid paths extend through a conduit that is defined at least in part by a deflector.

* * * * *